(12) United States Patent
Fujioka

(10) Patent No.: US 6,480,869 B1
(45) Date of Patent: Nov. 12, 2002

(54) RANDOM-NUMBER GENERATING CIRCUIT, NON-CONTACT IC CARD HAVING RANDOM-NUMBER GENERATING CIRCUIT, READER/WRITER, AND METHOD OF TESTING AN APPARATUS HAVING THE RANDOM GENERATING CIRCUIT

(75) Inventor: Shuzo Fujioka, Hyogo (JP)

(73) Assignees: Mitsubishi Denki Kabushiki Kaisha, Tokyo (JP); Mitsubishi Electric System LSI Design Corporation, Hyogo (JP)

( * ) Notice: Subject to any disclaimer, the term of this patent is extended or adjusted under 35 U.S.C. 154(b) by 0 days.

(21) Appl. No.: 09/364,031

(22) Filed: Jul. 30, 1999

(30) Foreign Application Priority Data

Feb. 3, 1999 (JP) .......................... 11-026369

(51) Int. Cl.[7] ................................ G06F 1/02
(52) U.S. Cl. ..................................... 708/252
(58) Field of Search ........................ 708/252

(56) References Cited

U.S. PATENT DOCUMENTS 5,105,376 A * 4/1992 Pedron ..................... 708/252
5,867,409 A * 2/1999 Nozuyama ............... 708/252
6,014,408 A * 1/2000 Naruse et al. ............ 708/252
6,014,446 A * 1/2000 Finkelstein ............... 708/252
6,240,432 B1 * 5/2001 Chuang et al. ........... 708/252
6,263,082 B1 * 7/2001 Iahimoto et al. .......... 708/252

FOREIGN PATENT DOCUMENTS

JP          5-316104          11/1993

* cited by examiner

Primary Examiner—David H. Malzahn
(74) Attorney, Agent, or Firm—McDermott, Will & Emery

(57) ABSTRACT

A random-number generating circuit comprising a plurality of shift registers synchronized with a clock and cascaded together, a circuit that obtains the sum of the outputs of more than one of the shift registers and inputs the obtained sum to the input terminal of the shift register on the first level, and a clock generating circuit that inputs a clock signal to each of the shift registers. One or more of the shift registers have external-signal input terminals and an addition circuit that adds bit data input through the external-signal input terminals to bit data of one or more of the bits stored within. The random-number generating circuit outputs as random-number data the bit data obtained from the addition by the addition circuit.

6 Claims, 8 Drawing Sheets

Fig.10 PRIOR ART Random-number generating circuit 500

RANDOM-NUMBER GENERATING CIRCUIT, NON-CONTACT IC CARD HAVING RANDOM-NUMBER GENERATING CIRCUIT, READER/WRITER, AND METHOD OF TESTING AN APPARATUS HAVING THE RANDOM GENERATING CIRCUIT

BACKGROUND OF THE INVENTION

1. Field of the Invention

The present invention relates to a random-number generating circuit and more particularly a random-number generating circuit used in non-contact IC cards and reader/writers for the non-contact IC cards.

2. Description of the Related Art

Of recent years, there have been provided a number of thin non-contact IC cards that have intelligent functions, rewritable memory functions and others. Non-contact IC cards are characterized by the fact that they are able to transmit data to and from a reader/writer without being physically connected to it. Non-contact IC cards are used, for example, as prepaid cards, door keys, commutation tickets for trains and buses, tickets for ski lifts, and the like.

In order to prevent illegal retrieval or modification of data stored in a non-contact IC card, the non-contact IC card and a reader/writer of the IC card perform processing of certifying each other before transmitting data between them. The reader/writer performs the mutual authentication processing for the IC card that sends back a predetermined response signal corresponding to a polling signal that has been sent by the reader/writer. As a method of the mutual authentication processing, a method of using cryptographic keys are known.

Mutual authentication processing using cryptography between a non-contact IC card and a reader/writer is described in the following. First, the reader/writer transmits a random number a generated therein to the non-contact IC card. The non-contact IC card converts the received random number a into a random number A, using its own cryptographic key, and sends the random number A back to the reader/writer. Using a cryptographic key shared with particular non-contact IC cards, the reader/writer processes the generated random number a to obtain a random number A' and compares the obtained random number A' with the returned random number A. If the random numbers A and A' coincide, the reader/writer certifies that the non-contact IC card is valid.

Next, the non-contact IC card transmits the random number b generated therein to the reader/writer. In this case, the reader/writer converts the received random number b to a random number B, using its own cryptographic key, and sends the random number B back to the non-contact IC card. Using a cryptographic key shared with particular reader/writers, the non-contact IC card processes the generated random number b to obtain a random number B' and compares the obtained random number B' with the returned random number B. If the random numbers B and B' coincide, the reader/writer certifies that the reader/writer is valid.

A random-number generating circuit is built into the non-contact IC card and the reader/writer.

Figure 10:
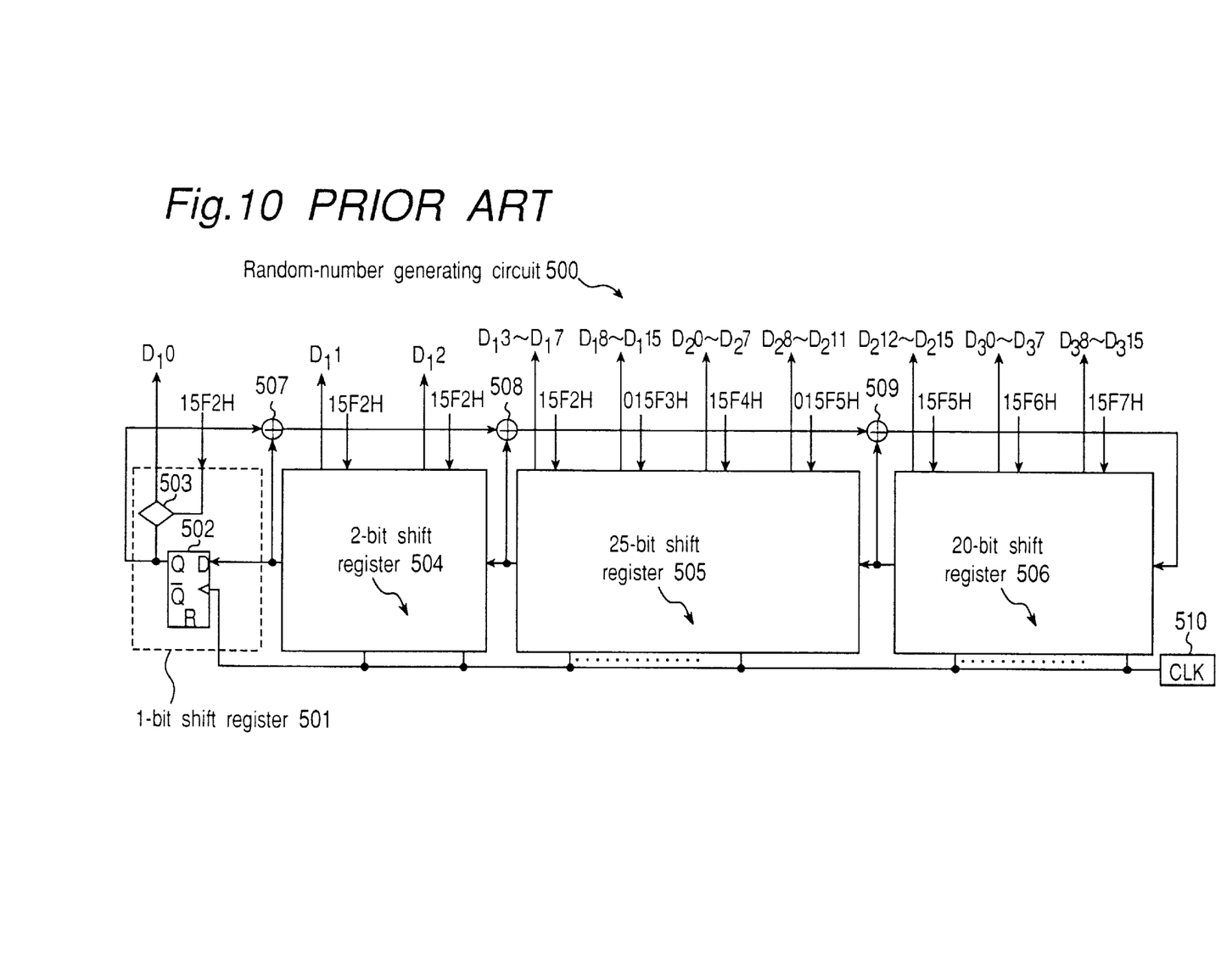
FIG. 10 is a block diagram of a prior random-number generating circuit.

FIG. 10 is a circuit diagram of a random-number generating circuit 500 used in prior art. The random-number generating circuit 500 is a so-called 48-bit M-sequence random-number generating circuit. It comprises a 1-bit shift register 501, a 2-bit shift register 504, a 25-bit shift register 505, and a 20-bit shift register 506 that are cascaded (in tandem) together, and adders 507, 508, and 509 that constitute an addition circuit that inputs the sum of the outputs of the shift registers to the input terminal of the 20-bit shift register 506, which is on the first level.

The 1-bit shift register 501 comprises a flip-flop 502 and a transfer gate 503 that operate in synchronization with a clock signal CLK that is output from a clock circuit 510. When address 02E2H is selected by a CPU, which is not illustrated, and an address-signal line is switched from LOW to HIGH, the 1-bit shift register 501 outputs the output of the flip-flop 502 as random-number data $D_1 0$.

The circuits of the 2-bit shift register 504, 25 bit shift register 505, and 20-bit shift register 506 are composed by connecting, in serial, a number of circuits that are the same as the 1-bit shift register 501, with the number being the number of shifts in each shift register. The 2-bit shift register 504 outputs random-number data $D_1 1$, $D_1 2$, when address 15F2H is selected. The 25-bit shift register 505 outputs random-number data $D_1 3$–$D_1 7$, $D_1 8$–$D_1 15$, $D_2 0$–$D_2 7$, and $D_2 8$–$D_2 11$, when addresses 15F2H, 15F3H, 15F4H, and 15F5H are selected. The 20-bit shift register 506 outputs random-number data $D_2 12$–$D_2 15$, $D_3 0$–$D_3 7$, and $D_3 8$–$D_3 15$, when addresses 15F5H, 15F6H, and 15F7H are selected.

Random numbers generated by the random-number generating circuit 500 described above have a generation pattern that is repeated with a predetermined period. Therefore, communication data transmitted between the reader/writer and the non-contact IC card can be tapped, and the generation pattern of random numbers can be identified. If the generation pattern of random numbers is identified, then even if the cryptographic key and the contents of the cryptographic processing are unknown, non-contact IC cards can be forged by using a table that associates the random number a with the random number A. Similarly, the reader writer can be forged by using a table that associates the random number b with the random number B.

In order to effectively prevent the forgery of the non-contact IC card and the reader/writer through the tapping of the communication data, there is required a random-number generating circuit such that the generation pattern can not be deciphered even if the communication data is tapped. However, if the random-number generating circuit is made complicated, then illegal decipherment of the generation pattern can be effectively prevented, but the circuit size becomes large. Particularly, the size of the built-in random-number generating circuit in non-contact IC cards is preferred to be smaller.

Further, the communication processing for a non-contact IC card is required to be completed during the time when the non-contact IC card is within the area where communication with the reader/writer is possible. Therefore, communication processing including the mutual authentication processing for a non-contact IC card is required to be processed faster than for an IC card that is used by inserting to a slot.

Also, in the case of non-contact IC cards, a plurality of non-contact IC cards may simultaneously exist within an area where communication with the reader/writer is possible. In this case, before communication processing including the mutual authentication processing, each non-contact IC card is required to perform some processing for avoiding its response signal crashing against the response signal issued from other non-contact IC cards. For example, each non-contact IC card outputs its response signal to the polling signal from the reader writer, with timing based on a random number that is generated within the non-contact IC card. To improve the speed of communication between the non-contact IC card and the reader/writer, a random-number generating circuit that operates at great speed is required.

SUMMARY OF THE INVENTION

The objects of the present invention are to contribute to miniaturization of the apparatus with a built-in random-number generating circuit with a simple configuration and to provide a random-number generating circuit that generates random-number data that has no regular pattern and is hard to predict, a non-contact IC card having the random-number generating circuit built therein, and a reader/writer for non-contact IC cards having the random-number generating circuit built therein.

The random-number generating circuit in a first embodiment in accordance with the present invention comprises a plurality of shift registers synchronized with a clock and cascaded together, a circuit that obtains the sum of the outputs of more than one of the shift registers and inputs the obtained sum to the input terminal of the shift register on the first stage, and a clock generating circuit that inputs a clock signal to each of the shift registers. The random-number generating circuit outputs, as random-number data, bit data output from the shift registers. One or more of the shift registers have external signal input means and a plurality of adders each that adds bit data input through the external signal input means to one or more bits of the bit data stored within. The bit data obtained by the adders are output as the random-number data.

The random-number generating circuit of this configuration generates random-number data, using the bit data flowing through external-signal lines, so that random-number data that has no regular pattern and is hard to predict can be generated.

In the random-number generating circuit in another embodiment in accordance with the present invention, the above clock generating circuit comprises a CLK circuit that generates a clock signal of a predetermined frequency and a PLL circuit that receives the clock signal generated by the CLK circuit as a reference-frequency signal. The output of the PLL circuit is input to each of the shift registers. The random-number generating circuit uses for a clock generating circuit the PLL circuit that outputs a clock signal of a frequency determined by the supplied source voltage until the frequency converges to the reference frequency. As a result, in an IC card having a built-in random-number generating circuit of the above second configuration, the value of the random-number data output immediately after the power is turned on can be varied by the dispersion of the constituent parts and the like.

In either the random-number generating circuit of the above first configuration or of the second configuration, a flip-flop that is a part of the above shift registers and operates in synchronization with a clock preferably has a first component that outputs HIGH as data output when the power is turned on and a second component that has the same drive and outputs LOW as data output when the power is turned on. The output terminals of both the first and second components are preferably connected to wire or transistors of the same writing capacity. In this way, the probability that the output data is HIGH (and the probability that the output data is LOW) when the power is turned on can be made 50%. By this means, an initial value output from each register becomes uniform when the power is turned on, so that the prediction of the random-number data becomes more difficult.

Further, a reset circuit is preferably additionally installed in the random-number generating circuit, and a logic circuit is preferably installed in the clock signal generating circuit. The reset circuit outputs a reset signal to each shift register, depending on the input of a reset-request signal. The logic circuit stops the output of the clock signal to each shift register, depending on a clock-stop signal and outputs the clock signal to each shift register, depending on a clock-operation signal. In this case, the clock signal can be stopped and activated depending on necessity. By this means, reading of a random number with predetermined timing becomes possible. Also, the bit data that is stored in each shift register can be reset.

The present invention also provides a non-contact IC card having one of the random-number generating circuits of the above configurations built within. This non-contact IC card has a control means that performs processing of communicating with a reader/writer, using the random-number data output from the random-number generating circuit. Predetermined signal lines that are used by the control means are connected to the above external-signal input terminals. Having one of the above random-number generating circuits built therein, the non-contact IC card can swiftly obtain random-number data that has no regular pattern and is hard to predict, so that high-speed communication processing with a corresponding reader/writer can be performed.

The present invention also provides a reader/writer used with above non-contact IC cards. The reader/writer has a control means that performs communication processing with a corresponding non-contact IC card by using random number output from the built-in random-number generating circuit. Predetermined signal lines used by the control means are connected to the external-signal input terminals. The reader/writer can swiftly obtain random-number data that has no regular pattern and is hard to predict, so that high-speed communication processing with a corresponding non-contact IC card can be performed.

Further, the present invention includes a method of testing an apparatus that has the above random-number generating circuit having the above reset circuit and the above clock generating circuit with the above logic circuit and that has a control means that performs predetermined processing by using random-number data output from the built-in random-number generating circuit and uses predetermined signal lines connected to the external-signal input terminals.

This testing method outputs a clock-stop signal into the logic circuit in the clock generating circuit, outputs a reset-request signal to the reset circuit, outputs a clock-operation signal into the logic circuit of the clock generating circuit, and performs test processing of the above apparatus, outputs a clock-stop signal into the logic circuit of the clock generating circuit, immediately after the completion of the test processing, reads random-number data output from an output means, and detects abnormalities in the system by comparing the read random-number data with reference data.

According to this testing method, the above random-number generating circuit is used as a testing circuit, so that a dedicated testing circuit is unnecessary, and miniaturization of the apparatus can be realized.

BRIEF DESCRIPTION OF THE DRAWINGS

The present invention will become clear from the following description of embodiments thereof made with reference to the accompanying drawings, in which like parts are designated by like reference numerals, and in which.

DETAILED DESCRIPTION OF THE PREFERRED EMBODIMENTS

The random-number generating circuit, the non-contact IC card having the built-in random-number generating circuit, and the reader/writer having the built-in random number generating circuit for non-contact IC cards of the preferred embodiments in accordance with the present invention will be described below in conjunction with the attached drawings.

(1) Non-contact IC Cards

Figure 1:
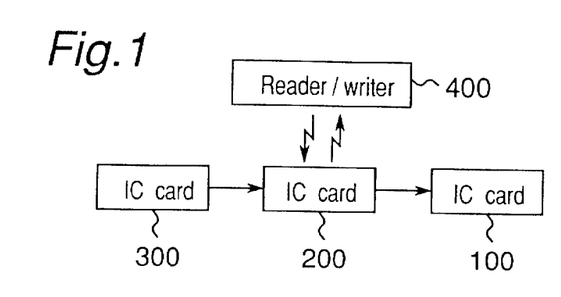
FIG. 1 is an illustration for describing an application configuration of a reader/writer and non-contact IC cards.

A non-contact IC card having a built-in random-number generating circuit in accordance with the present embodiment is supposed to be employed, for example, in automatic ticket examiners of a subway system. Specifically, as shown in FIG. 1, suppose that three people respectively having non-contact IC cards 100, 200, 300, which function as commutation tickets or coupon tickets or the like, successively pass in front of a reader/writer 400 that functions as an automatic ticket examiner. Reader/writer 400 successively recognizes IC cards 100, 200, that enter the reader/writer's communication area, when they pass in front of reader/writer 400. Reader/writer 400 then reads out, from each card, information about the class of the card, such as whether it is a commutation ticket or a coupon ticket, the expiration for a commutation ticket, and the remaining numbers for a coupon ticket, and renews the information stored in the card if necessary.

(2) Authentication of Non-contact IC Cards

Reader/writer 400 performs mutual authentication processing with a non-contact IC card that has returned a predetermined response signal to a polling signal issued from reader/writer 400.

Figure 2:
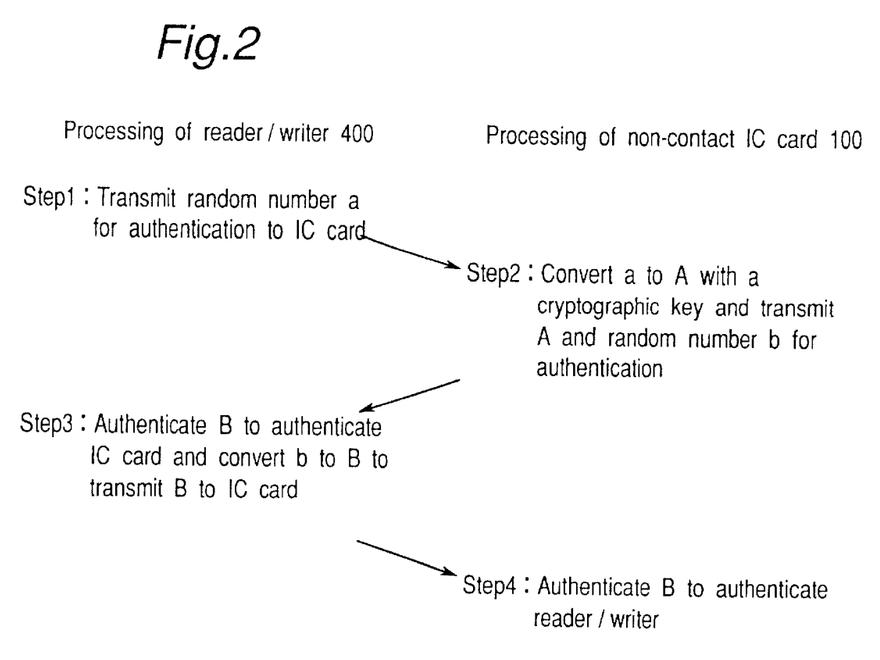
FIG. 2 illustrates the sequence of mutual authentication processing performed by a reader/writer and a non-contact IC card.

FIG. 2 illustrates the sequence of mutual authentication processing performed by a non-contact IC card 100 and reader/writer 400. First, reader/writer 400 transmits a random number a for authentication that has been generated by a built-in random-number generating circuit to non-contact IC card 100 (Step S1). Non-contact IC card 100 that has received the random number a for authentication within the communication area converts the random number a to a random number A by using its own cryptographic key and sends the random number A back to reader/writer 400; non-contact IC card 100 also sends a random number B for authentication that has been generated by a built-in random-number generating circuit to reader/writer 400 (Step S2). Reader/writer 400 converts the random number a to a random number A' by using a cryptographic key shared with accessed non-contact IC cards and certifies non-contact IC card 100, if the random number A' and the random number A non-contact IC card 100; reader/writer 400 also converts the random number b transmitted from non-contact IC card 100 to a random number B by using its own cryptographic key and sends the random number B back to IC card 100 (Step S3). Non-contact IC card 100 converts the random number b to a random number B' by using a cryptographic key shared with accessed reader/writers and certifies reader/writer 400, if the random number B' and the returned random number B agree (Step S4).

(3) Configuration of Non-contact IC Cards and Reader/writers

Figure 3:
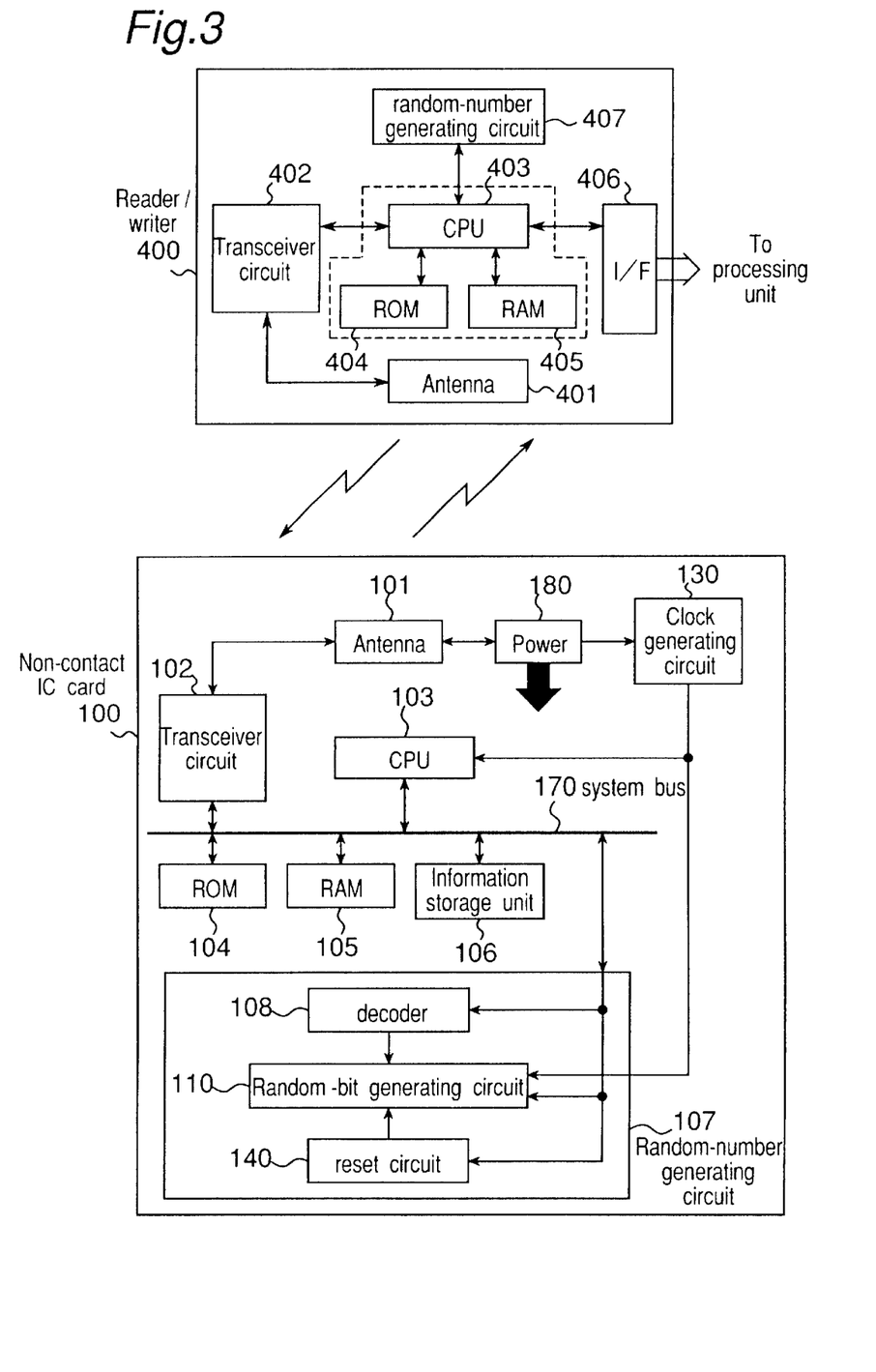
FIG. 3 is a block diagram illustrating a reader/writer and a non-contact IC card.

FIG. 3 is a block diagram of a reader/writer and a non-contact IC card. The configurations of non-contact IC cards 200 and 300 are the same as that of non-contact IC card 100, so that the descriptions are omitted here. Non-contact IC card 100 is a batteryless type non-contact IC card. A power circuit 180 receives a high-frequency signal transmitted from reader/writer 400 through an antenna 101 and supplies a signal obtained by rectifying the received high-frequency signal to each internal circuit including a clock generating circuit 130 as a supply signal of Vcc volts. The configuration of power circuit 180 will be described later.

Clock generating circuit 130 is driven by the voltage Vcc supplied from the power circuit 180, and outputs a clock signal CLK to a central processing unit CPU 103, a random-bit generating circuit 110 that composes a random-number generating circuit 107, and other components. The configuration of clock generating circuit 130 will be described later.

CPU 103 is connected to a transceiver circuit 102, a ROM 104, a RAM 105, an information storage unit 106, and random-number generating circuit 107. Transceiver circuit 102 is connected to antenna 101 and transmits to the outside a high-frequency signal that carries instructions and data sent from CPU 103, through antenna 101, and extracts instructions and data from a high-frequency signal received through antenna 101 to output into CPU 103. ROM 104 stores programs that perform communication processing such as mutual authentication processing with reader/writer and the like. RAM 105 is used when a program stored in ROM 104 is run. Information storage unit 106 holds inherent information such as the expiration and the effective zone in the case where non-contact IC card is used as a commutation ticket. When performing communication processing with reader/writer 400, CPU 103 renews the information stored in the information storage unit 106, depending on necessity. Random-number generating circuit 107 outputs random-number data used in mutual authentication processing with reader/writer into the CPU 103, depending on a predetermined address selected by CPU 103.

Random-number generating circuit 107 comprises a decoder 108, a random-bit generating circuit 110, and a reset circuit 140. Decoder 108 decodes the data of an address signal input through a system bus 170 of CPU 103 to output into random-bit generating circuit 110. When the data of an address signal, the data of a data signal, and the data of a signal, which flow through system bus 170, are input to random-bit generating circuit 110 in order to make random data generated therein complicated, and when a predetermined address is selected through the decoder 108, random-bit generating circuit 110 outputs random-number data of 3 bytes (48 bits) into CPU. Reset circuit 140 outputs a predetermined reset signal into random-bit generating circuit 140, depending on control by CPU 103. The configurations of random-bit generating circuit 110 and reset circuit 140 are described later.

Reader/writer 400 comprises an antenna 401, a transceiver circuit 402 that sends and receives a high-frequency signal that carries instructions and data through the antenna 401, a ROM 404 that stores communication programs including a program for mutual authentication processing with the IC card 100, a RAM 405 that is used when programs are executed by CPU 403, an interface 406, and a random-number generating circuit 407. The configuration of random-number generating circuit 407 is the same as that of random-number generating circuit 107 built in non-contact IC card 100.

The central processing unit CPU 403 in reader/writer 400 is connected to transceiver circuit 402, ROM 404, RAM 405, interface 406, and random-number generating circuit 407. Transceiver circuit 402 extracts instructions and data from a high-frequency signal received from the connected antenna 401 to output into CPU 403 and also transmits a high-frequency signal that carries instructions and data sent from CPU 403 through antenna 401. CPU 403 uses random-number data obtained from random-number generating circuit 407, for example, during the execution of mutual authentication processing with non-contact IC card 100. CPU 403 outputs the results of the communication processing into each processing unit through interface 406.

Figure 4:
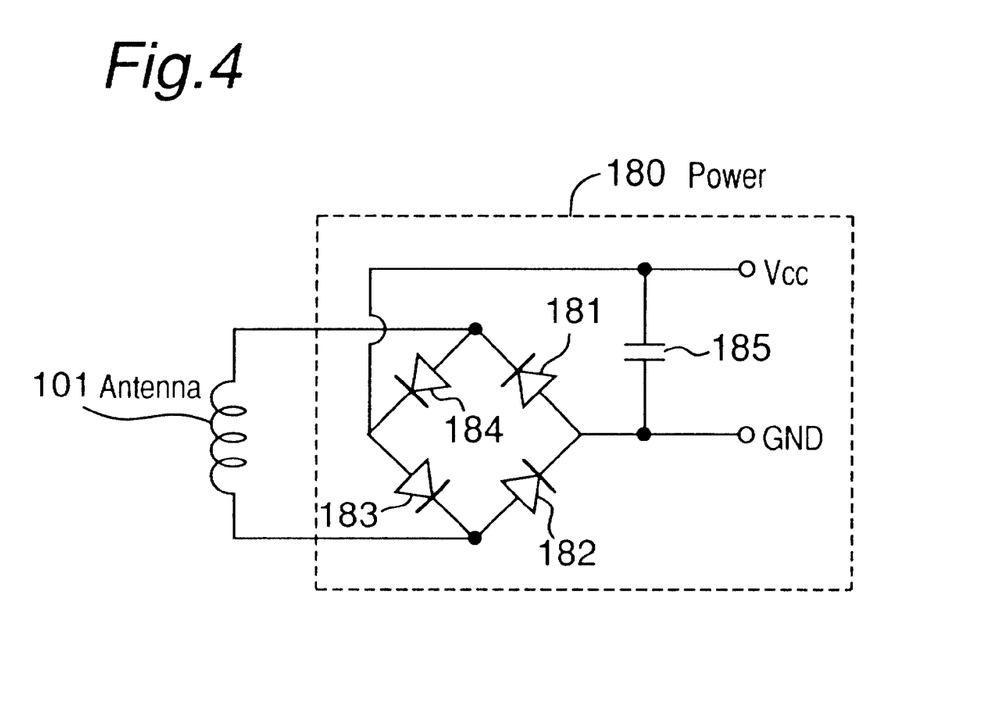
FIG. 4 is a block diagram illustrating the configuration of a power circuit.

FIG. 4 is a block diagram illustrating the configuration of power circuit 180. Power circuit 180 comprises diodes 181, 182, 183, 184 and a capacitor 185 that constitute a rectifier circuit. The rectifier circuit performs rectification of the high-frequency signal input through antenna 101 and outputs a signal obtained by the rectification into each internal circuit as a power supply signal.

Figure 5:
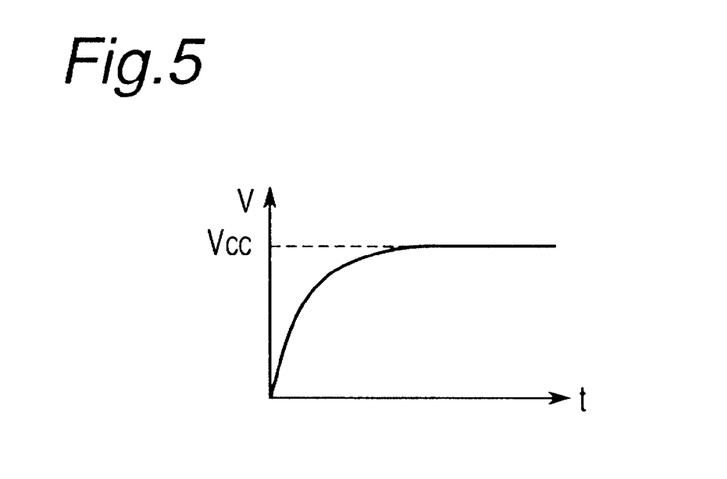
FIG. 5 is a graph illustrating the output characteristic of the power circuit.

FIG. 5 is a graph illustrating changes in the electric potential of the power supply signal output from power circuit 180 from the beginning of receiving a high-frequency signal from reader/writer 400. As shown in the figure, a predetermined time period is required from the beginning of receiving the high-frequency signal until the electric potential of the power supply signal output from power circuit 180 becomes a predetermined value Vcc. The time required for the power supply signal becoming Vcc is varied by environments of communication with reader/writer 400.

(4) Random-number Generating Circuit

Figure 6:
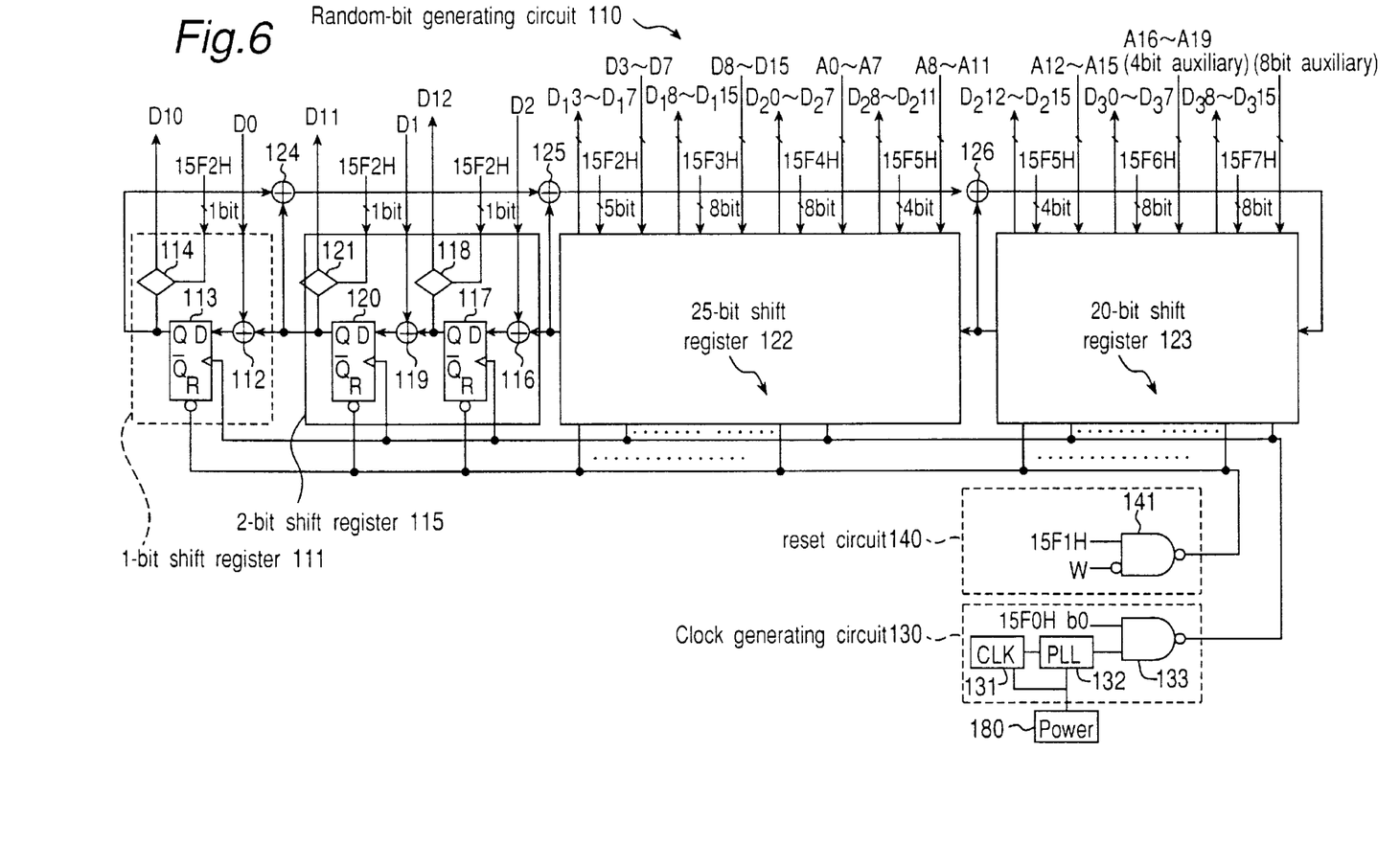
FIG. 6 is a block diagram of a random-bit generating circuit.

FIG. 6 is a block diagram illustrating detailed configurations of random-bit generating circuit 110, reset circuit 140, and clock generating circuit 130 built into random-number generating circuit 107.

(4-1) Random-bit Generating Circuit

Random-bit generating circuit 110 is characterized in that it adopts a configuration of adding bit data that varies with time, depending on the processing contents obtained by CPU 103, to each bit data stored in 1-bit shift register 111, 2-bit shift register 115, 25-bit shift register 122, and 20-bit shift register 123 that constitute a so-called 48-bit M-sequence random-number generating circuit. More specifically, the processed contents obtained by CPU 103 are the bit data A0 to A19 of a 20-bit address signal, the bit data D0 to D15 of a 15-bit data signal, and the 12-bit data of other signals that flow through system bus 170. The 3-byte or 48-bit data $D_1 0$ to $D_1 15$, $D_2 0$ to $D_2 15$, and $D_3 0$ to $D_3 15$ that are obtained by the addition is output as random-number data.

Further, random-bit generating circuit 110 adopts a simple configuration that is obtained by connecting shift registers and adders (EXOR gates), so that high-speed generation of random numbers can be achieved.

The configuration of random-bit generating circuit 110 is described in more detail in the following.

Random-bit generating circuit 110 comprises a 1-bit shift register 111, a 2-bit shift register 115, a 25-bit shift register 122, and a 20-bit shift register 123 that are cascaded (in tandem) together, and three adders 124, 125, and 126 that constitute an addition circuit that inputs the sum of the outputs of the shift registers to the input terminal of the 20-bit shift register 123, which is on the first level.

The input terminal of 20-bit shift register 123 is connected to the output terminal of adder 126. The output terminal of 20-bit shift register 123 is connected to the input terminal of adder 126 and the output terminal of 25-bit shift register 122. The output terminal of 25-bit shift register 122 is connected to the input terminal of adder 125 and the input terminal of 2-bit shift register 115. The output terminal of 2-bit shift register 115 is connected to the input terminal of adder 124 and the input terminal of 1-bit shift register 111. The output terminal of 1-bit shift register 111 is connected to the input terminal of adder 124. The output terminal of adder 124 is connected to the input terminal of adder 125. The output terminal of adder 125 is connected to the input terminal of adder 126.

When address 15F2H is selected through decoder 108, and the corresponding address-signal line turns from LOW to HIGH, 1-bit shift register 111 outputs, as random-number data, bit 0 ($D_1 0$) of the data obtained by adding to the 1-bit data stored therein bit 0 (D0) of the 16-bit data signal flowing through system bus 170.

1-bit shift register 111 comprises an adder 112, a flip-flop 113, and a transfer gate 114. Adder 112 consists in, for example, an EXOR gate. Adder 112 outputs into flip-flop 113 bit 0 obtained by adding bit 0 (D0) of the 16-bit data signal input through system bus 170 to the output of 2-bit shift register 115, which is on the preceding level. Flip-flop 113 is a flip-flop of clock-synchronization type and operates in synchronization with the transient timing of the clock signal CLK input through the clock input terminal. When address 15F2H is selected, and the corresponding address-signal line turns from LOW to HIGH, transfer gate 114 outputs the output Q of flip-flop 113 as random-number data $D_1 0$.

When address 15F2H is selected through decoder 108, and the corresponding signal line turns from LOW to HIGH, 2-bit shift register 115 outputs as random-number data the data $D_1 1$ and $D_1 2$ obtained by adding to the 2-bit data stored therein bit 2 (D2) and bit 1 (D1) of the 16-bit data signal input through the data bus.

As shown in the figure, 2-bit shift register 115 is composed of two 1-bit shift registers connected in serial. Specifically, an adder 116, a flip-flop 117, and a transfer gate 118 constitute a first 1-bit shift register, and an adder 119, a flip-flop 120, and a transfer gate 121 constitute a second 1-bit shift register. The 25-bit shift register 122 and 20-bit shift register 123 are also similarly composed. The contents of signal processing in each shift register are the same as those in 1-bit shift register 111, so that their descriptions are omitted here.

When addresses 15F2H, 15F3H, 15F4H, and 15F5H are selected, 25-bit shift register 122 outputs the 25-bit data $D_1 3$ to $D_1 7$, $D_1 8$ to $D_1 15$, $D_2 0$ to $D_2 7$, and $D_2 8$ to $D_2 11$ obtained by adding to the 25-bit data stored therein bit 0 to bit 11 (data A0 to A11) of the 20-bit address signal input through the address bus and bit 3 to bit 15 (bit data D3 to D15) of the 16-bit data signal input through the data bus.

When addresses 15F5H, 15F6H, and 15F7H are selected, 20-bit shift register 123 outputs the 20-bit data $D_212$ to $D_215$, $D_30$ to $D_37$, and $D_38$ to $D_315$ obtained by adding to the 20-bit data stored therein bit 0 to bit 7 (bit data Rev0 to Rev7) of the signal composed of the signals other than the address signal and the data signal and bit 12 to bit 19 (bit data A12 to A19) of the 20-bit address signal input through the address bus.

As described above, random-bit generating circuit 110 adopts the configuration of adding bit data that constitutes the address signal, data signal, and other signals flowing through system bus 170 to the bit data stored in each of the shift registers 111, 115, 122, and 123. The values of the signals flowing through system bus 170 vary with the contents of executed processing, so that random-number data that has no regular pattern and is hard to predict can be generated. By this means, even if communication data exchanged between non-contact IC card 100 and reader/writer 400 is tapped, the determination of the generation pattern for random numbers becomes difficult, so that the forgery of non-contact IC cards can be effectively prevented. Further, random-bit generating circuit 110 is constructed with a simple configuration that is obtained by connecting shift registers and adders (EXOR gates), so that high-speed generation of random numbers can be achieved.

The above random-bit generating circuit 110 adopts the configuration of inputting the sum of the outputs from all the shift registers cascaded together to the input terminal of the 20-bit shift register 123, which is on the first level. However, the configuration is not limited to that, so far as the sum of the outputs of two or more of the four shift registers is input to the 20-bit shift register, which is on the first level.

Further, random-bit generating circuit 110 adopts the configuration of adding the bit data on system bus 170 to all the bit data stored in each shift register. However, The configuration is not limited to that, so far as the bit data on system bus 170 is added to one or more bits of the bit data stored in each shift register.

(4-2) Reset Circuit

Reset circuit 140 consists in a 2-input NAND gate 141. The address-signal line for address 15F1H is connected to one input terminal of the NAND gate 141, and to the other input terminal is connected to a W-signal line that switches from LOW to HIGH when a write instruction is issued. CPU 103 can reset each of the shift registers 111, 115, 122, and 123 that constitute random-bit generating circuit 110 by writing data to address 15F1H.

(4-3) Clock generating Circuit

As shown in FIG. 6, clock generating circuit 130 comprises a CLK circuit 131, a PLL 132, and a NAND gate 133. CLK circuit 131 outputs into PLL circuit 132 a clock signal of a predetermined period as a reference-frequency signal, at the time when a voltage supply signal is output from power circuit 180. As is well-known, PLL circuit 132 outputs a clock signal of a period determined in proportion to the electric potential of the voltage supply signal output from power circuit 180 until the electric potential converges to the frequency of the reference-frequency signal. The output terminal of PLL circuit 132 is connected to one input terminal of 2-input NAND gate 133. Bit 0 (b0) at the decoded address 15F0H is input to the other input terminal of NAND gate 133. Ordinarily, the data b0 at address 15F0H is set at LOW, and NAND gate 133 outputs the inverted signal of the clock signal CLK from PLL circuit 131 into each of the shift registers 111, 115, 122, and 123 that constitute random-bit generating circuit 110.

As described above, the frequency of the clock signal output from clock generating circuit 130 is determined by the electric potential of the voltage supply signal output from power circuit 180. Therefore, during the time until the electric potential of the voltage supply signal output from power circuit 180 becomes stable at the reference value Vcc, even if the random number is read out with the same timing, the value of the random-number data output from random-bit generating circuit 110 differs. Also, even if non-contact IC cards 200 and 300 are configured the same as non-contact IC card 100, the timing of reading out the random-number data subtly differs, so that the random-number data output from random-bit generating circuit 110 immediately after the power is turned on differs from card to card. In this way, the adoption of the above configuration of clock generating circuit 130 makes more difficult the determination of the generation pattern of random-number data by tapping communication data.

In clock generating circuit 130 of the above configuration, when CPU 103 switches bit 0 (bit data b0) at address 15F0H from LOW to HIGH, NAND gate 133 outputs only HIGH. By this means, the output of the clock signal into each of the shift registers 111, 115, 122, and 123 that constitute random-bit generating circuit 110 is terminated and the function of each shift register is terminated. Further, when the value of bit 0 (data b0) at address 15F0H is switched from HIGH to LOW, the output of the clock signal is restarted. In this way, CPU 103 can stop and start the operation of random-bit generating circuit 110.

(4-4) Flip-flop

Figure 7:
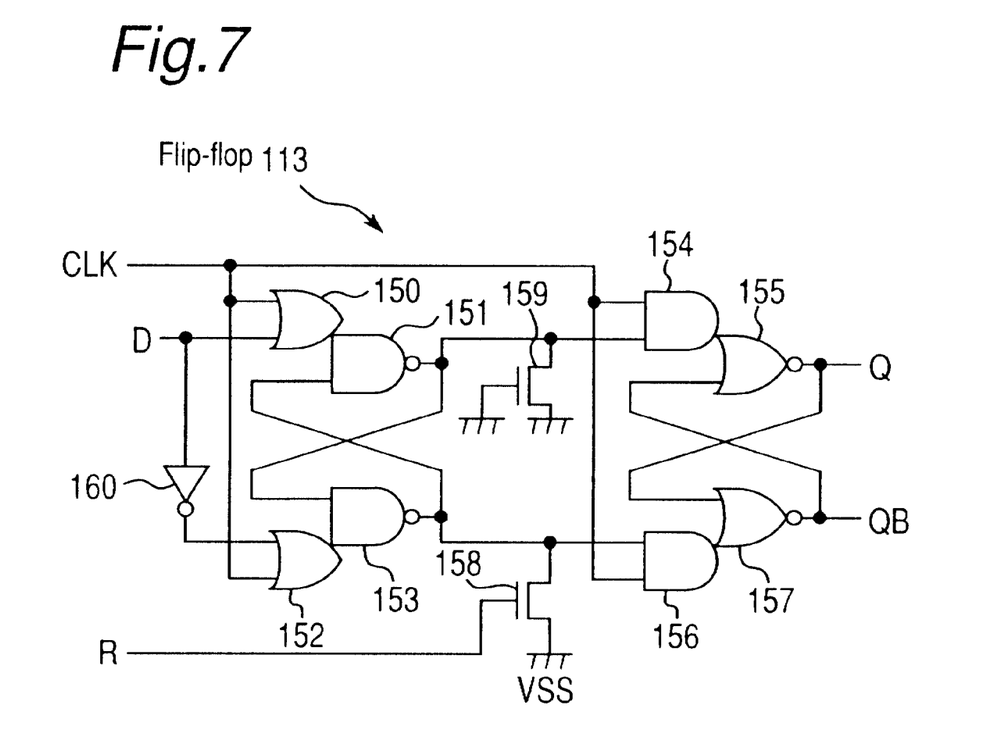
FIG. 7 is a block diagram of a flip-flop that operates in synchronization with a clock.

Flip-flop 113 of clock synchronization type that is a part of 1-bit shift register 111 has a first component that outputs HIGH as data output when the power is turned on, and a second component that has the same drive and outputs LOW as the data output when the power is turned on. The output terminals of both the first and second components are preferably connected to wire or transistors of the same capacity. In this way, the probability that the output data is HIGH (and the probability that the output data is LOW) when the power is turned on can be made 50%.

FIG. 7 is a block diagram illustrating the configuration of flip-flop 113. One input terminal of a 2-input OR gate 150 is connected to the input terminal of the clock signal CLK, and the other input terminal is connected to the input terminal of the data signal D. The output terminal of OR gate 150 is connected to one input terminal of a 2-input NAND gate 151. The output terminal of NAND gate 151 is connected to one input terminal of a 2-input NAND gate 153, the drain electrode of an N-channel MOS transistor 159, whose gate electrode and source electrode are grounded, and one input terminal of a 2-input AND gate 154. One input terminal of a 2-input OR gate 152 is connected to the input terminal of the clock signal CLK, and the other input terminal is connected to the input terminal of the data signal D through an inverter 160.

The output terminal of OR gate 152 is connected to one input terminal of a 2-input NAND gate 153. The output terminal of NAND gate 153 is connected to the remaining input terminal of NAND gate 151, the drain electrode of an N-channel MOS transistor 158, and the other input terminal of 2-input AND gate 156. A reset terminal is connected to the gate electrode of N-channel MOS transistor 158. The output terminal of NOR gate 155 is connected to the output terminal of data Q and the input terminal of NOR gate 157. The output terminal of NOR gate 157 is connected to the output terminal of the inverted signal of data Q and the input terminal of NOR gate 155.

The flip-flop 113 configured as above adopts, as NAND gates 151 and 153, which are the components that influence the value of data output when the power is turned on, the ones that have the same drive capacity. Further, the lengths of the wire connected to the output terminals of NAND gates 151 and 153 are designed to be the same so that their wire capacities should be the same. Also, a MOS transistor 159 having the same specification as the specification of N-channel MOS transistor 158 is installed at the corresponding place so that the capacity added to the wire by N-channel MOS transistor 158 connected to the reset terminal should be compensated. By this means, the probability that the value of the signal output from flip-flop 113 into the output terminal D is HIGH (and the probability that the value of the signal output from flip-flop 113 into the output terminal D is LOW) is made 50%. Random-bit generating circuit 110 adopts, as 2-bit shift register 115, 25-bit shift register 122, and 20-bit shift register, flip-flops configured the same as the above flip-flop 113. By this means, an initial value without deviation is output from each shift register at the activation time of non-contact IC card 100.

(5) Random-number Generation Processing

The random-number generation processing performed by CPU using random-number generating circuit 110 configured as above is described in the following.

Figure 8:
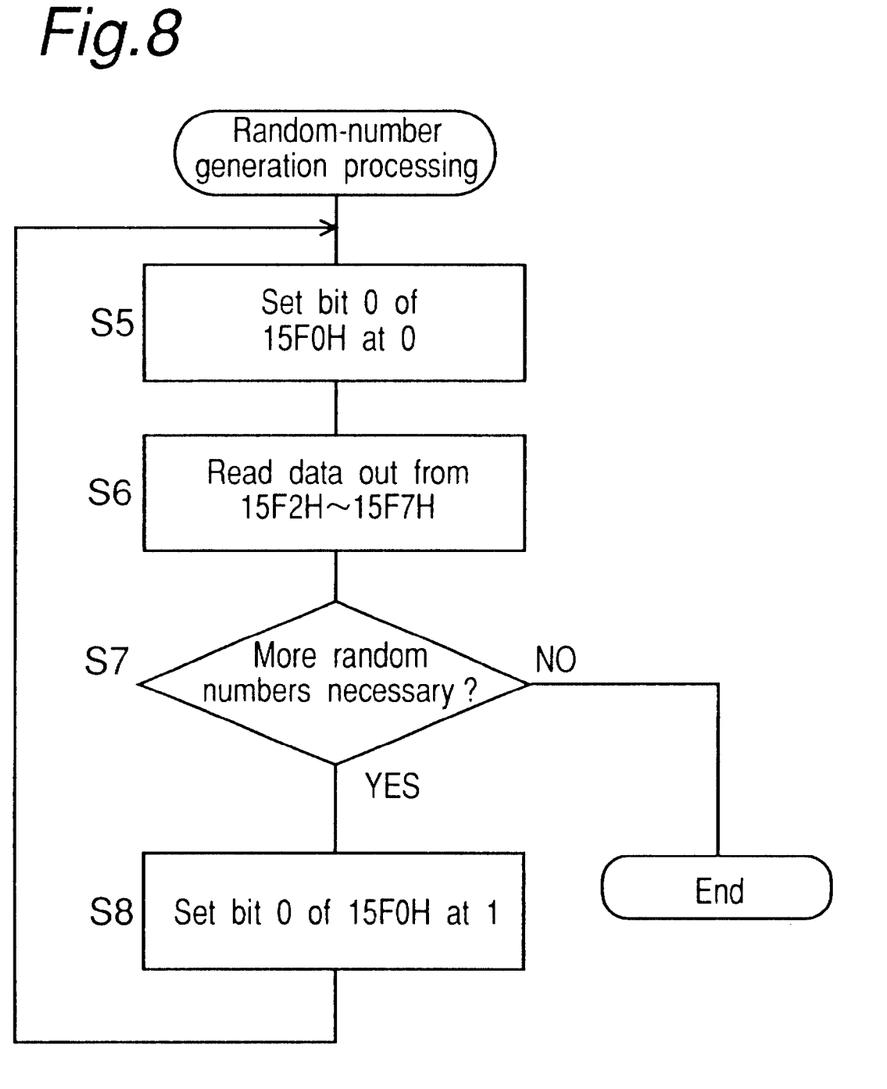
FIG. 8 is a flowchart of random-number generating processing performed by a CPU.

FIG. 8 is a flowchart of the random-number generation processing. First, bit 0 (data b0) at address 15F0H is set at 0 (Step S5). The output of the clock signal CLK from clock generating circuit 130 is terminated by this step, and the operation of random-bit generating circuit is terminated. Addresses 15F2H to 15F7H are selected, and the corresponding signal lines are switched from LOW to HIGH, and data $D_1 0$ to $D_1 15$, $D_2 0$ to $D_2 15$, and $D_3 0$ to $D_3 15$ are read out as random-number data (Step S6). If another random number is further necessary (YES in Step S7), then bit 0 (data b0) at address 15F0H is set at 1, and random-bit generating circuit 110 is activated (Step S8). Then the processing returns to S5. If no more random-number is necessary (NO in Step S7), the processing is terminated.

By performing the above processing, CPU 103 can extracts random-number data generated in random-generating circuit 110 with predetermined timing.

(6) Test Processing

As described above, random-number generating circuit 107 is characterized in that it uses data flowing in system bus 170 to generate a random number that is hard to predict. In the state where the clock signal CLK of a predetermined frequency is input, after random-bit generating circuit 110 is reset, the test processing of non-contact IC card 100 can be performed. In this case, if the circuits are normal, the random-number data output from random-bit generating circuit 110 immediately after the execution of the test processing always becomes a constant value. If we use this property, we can use random-number generating circuit 107 for testing the operation of IC card 100. By using random-number generating circuit 107 for a testing device, we can make dedicated circuits for testing unnecessary and achieve miniaturization of non-contact IC card 100.

Figure 9:
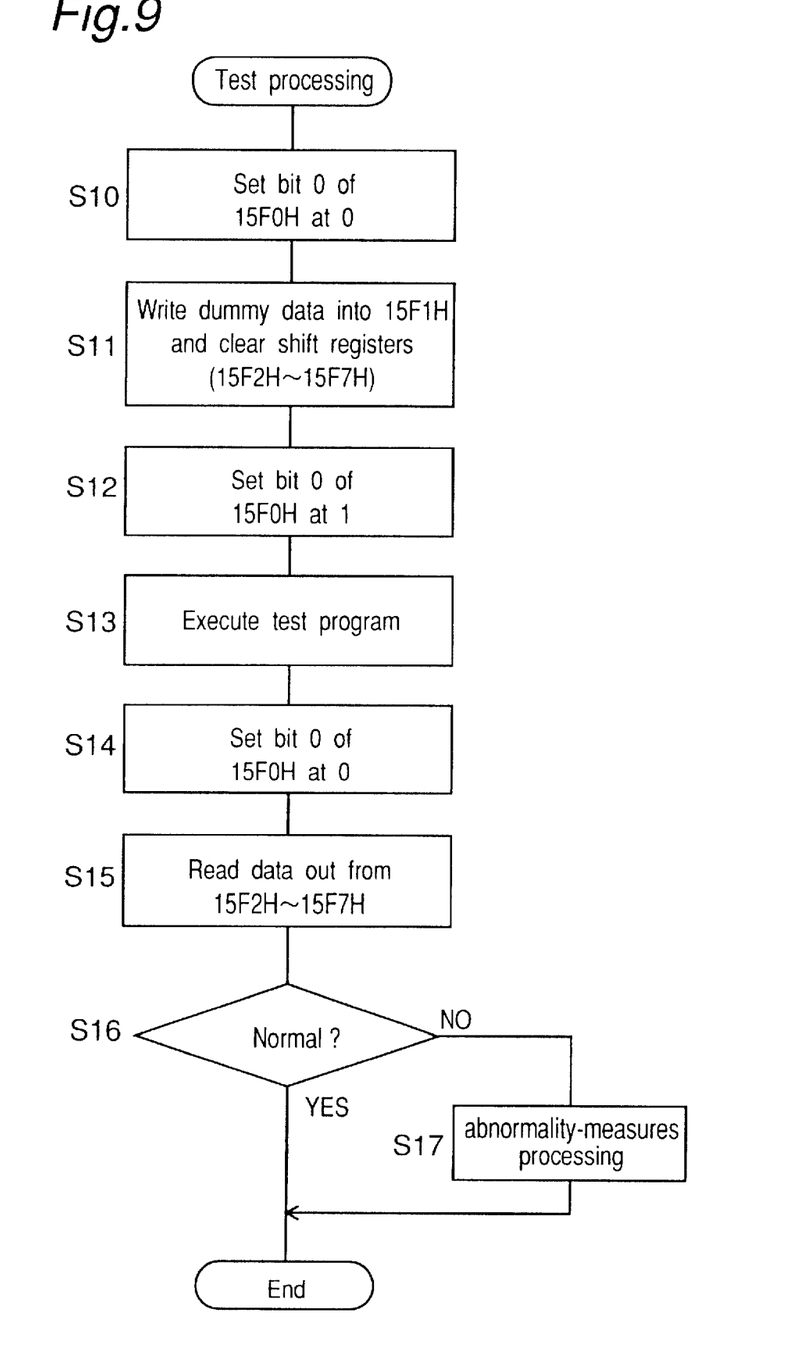
FIG. 9 is a flowchart of test processing performed by a CPU.

FIG. 9 is a flowchart of the test processing that is performed by CPU 103 using random-bit generating circuit 110. First, in the state where the electric potential of the voltage supply signal output from power circuit 180 is stabilized at the reference value Vcc, and the clock signal CLK of a predetermined frequency is stably output, bit 0 (data b0) at address 15F0H is set at 0, and the operation of clock generating circuit 130 is terminated, that is, the operation of random-bit generating circuit 110 is terminated (Step S10). Dummy data is written into address 15F1H, the value W of the write instruction is switched from LOW to HIGH, and data in each of the shift registers 111, 115, 122, 123 (data in addresses 15F2H to 15F7H) is cleared by activating reset circuit 140 (Step S11). Bit 0 (data b0) at address 15F0H is set at 1, and clock generating circuit 130 is started (Step S12). A test program stored in ROM 104 is executed (Step S13). After the execution of the test program is finished, bit 0 (data b0) at address 15F0H is set at 0, and the operation of clock generating circuit 130 is terminated (Step S14). Addresses 15F2H to 15F7H are selected, the corresponding address-signal lines are switched from LOW to HIGH, and bit data $D_1 0$ to $D_1 15$, $D_2 0$ to $D_2 15$, and $D_3 0$ to $D_3 15$ are read out (Step S15).

When internal circuits are normal, the values of the bit data $D_1 0$ to $D_1 15$, $D_2 0$ to $D_2 15$, and $D_3 0$ to $D_3 15$ read out in Step S15 show a constant value. Therefore, the values of bit data read out in Step S15 are compared with reference values, such as the values of the bit data read out or stored previously, and whether something abnormal has happened within the circuits is determined (Step S16). As a result of the comparison, if the values of the bit data read out are the same as the reference values, then the circuits are judged to be normal (YES in Step S16), and the test processing is terminated. On the other hand, if at least one of the values of the bit data read out does not agree with the corresponding reference value, then the circuits are judged to be abnormal (NO in Step S16), and processing of abnormality-measures such as protection of internal data and others is performed (Step S17), and the test processing is terminated.

As described above, random-number generating circuit 107 generates random numbers by using the values of the bit data of the address signal, data signal, and the like input through system bus 170, so that it can generates random-number data that has no regular pattern and is hard to predict. Also, the random-number generating circuit adopts random-bit generating circuit 110 having a simple configuration composed of shift registers and adders, so that it realizes miniaturization of the circuit and high-speed generation of random numbers. Further, the use of the random-bit generating circuit 110 for a testing apparatus for non-contact IC card 100 eliminates a dedicated testing circuit and achieves miniaturization of non-contact IC card 100.

Reader/writer 400 has random-number generating circuit 407 that is of the same configuration as the configuration of random-number generating circuit 107 that is built into non-contact IC card 100. Therefore, reader/writer 400 can also swiftly generates a random number that has no regular pattern and is hard to predict. Further, the use of a random-bit generating circuit (not illustrated) in random-number generating circuit 407 for a testing apparatus for reader/writer 400 eliminates a dedicated testing circuit and achieves miniaturization of reader/writer 400.

Although the present invention has been fully described in connection with the preferred embodiments thereof and the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A random-number generating circuit comprising:
   a plurality of shift registers of clock synchronization type being cascaded so as to generate a random-number of predetermined bit number with parallel outputs of said plurality of shift registers;
   a circuit that obtains a sum of serial outputs of two or more of said plurality of shift registers to input the obtained sum to an input terminal of the first stage shift register;

a clock generating circuit that generates a clock signal to input the clock signal to each shift register;

an external data input means that inputs external bit data of a predetermined number of bits to one or more of said plurality of shift registers; and a plurality of adders arranged within one or more of said plurality of shift registers, each adder adding corresponding one bit of the input external bit data to corresponding one bit of bit data being shifted within corresponding shift register, thereby the random-number including a plurality of bit data added by said plurality of adders, and wherein each shift register is comprised of one or more flip-flop circuits of clock synchronization type the number of which is equal to the number of parallel output bits of each shift register, and wherein each flip-flop circuit provides with a first element for making an output data HIGH upon turning an electric power on and a second element for making an output data LOW upon turning the electric power on, said second element having a derivability same to that of said first element.

2. A random-number generating circuit according to claim 1 in which output terminals of said first and second elements are connected to wirings having an identical wiring capacity.

3. A random-number generating circuit comprising:

a plurality of shift registers of clock synchronization type being cascaded so as to generate a random-number of predetermined bit number with parallel outputs of said plurality of shift registers;

a circuit that obtains a sum of serial outputs of two or more of said plurality of shift registers to input the obtained sum to an input terminal of the first stage shift register; and a clock generating circuit that generates a clock signal to input the clock signal to each shift register, said clock generating circuit having a clock circuit that generates a clock signal of a predetermined frequency and a phase-locked loop circuit that receives the clock signal generated by said clock circuit as a reference frequency signal and output a clock signal to each of said plurality of shift registers, and wherein each shift register is comprised of one or more flip-flop circuits of clock synchronization type the number of which is equal to the number of parallel output bits of each shift register, and wherein each flip-flop circuit provides with a first element for making an output data HIGH upon turning an electric power on and a second element for making an output data LOW upon turning the electric power on, said second element having a derivability same to that of said first element.

4. A random-number generating circuit according to claim 3 in which output terminals of said first and second elements are connected to wirings having an identical wiring capacity.

5. A random-number generating circuit according to claim 3 further comprising a reset circuit that outputs a reset signal to each shift register in response to a reset request signal input thereto and said clock signal generating circuit further comprising a logic circuit that stops the output of the clock signal to each shift register when a clock-stop signal is input thereto externally and outputs the clock signal to each shift register when a clock-operation signal is input thereto externally.

6. A non-contract IC card for communicating information with a reader/writer, said non-contact IC card having:

a built-in random-number generating circuit that comprises a plurality of shift registers of clock synchronization type being cascaded so as to generate a random-number of predetermined bit number with parallel outputs of said plurality of shift registers;

a circuit that obtains a sum of serial outputs of two or more of said plurality of shift registers to input the obtained sum to an input terminal of the first stage shift register;

a clock generating circuit that generates a clock signal to input the clock signal to each shift register;

an external data input means that inputs external bit data of a predetermined number of bits to one or more of said plurality of shift registers; and a plurality of adders arranged within one or more of said plurality of shift registers, each adder adding corresponding one bit of the input external bit data to corresponding one bit of bit data being shifted within corresponding shift register, thereby the random-number including a plurality of bit data added by said plurality of adders; and wherein each shift register is comprised of one or more flip-flop circuits of clock synchronization type the number of which is equal to the number of parallel output bits of each shift register, and wherein each flip-flop circuit provides with a first element for making an output data HIGH upon turning an electric power on and a second element for making an output data LOW upon turning the electric power on, said second element having a derivability same to that of said first element; and a control circuit that performs communication with said reader/writer using a random-number generated by said built-in random-number generating circuit; and wherein said external data input means is connected to a signal line connected to said control circuit to fetch bit data carried on said signal line into one or more of said plurality of shift registers.

* * * * *